US006385566B1

(12) United States Patent
Tillery, Jr.

(10) Patent No.: US 6,385,566 B1
(45) Date of Patent: May 7, 2002

(54) SYSTEM AND METHOD FOR DETERMINING CHIP PERFORMANCE CAPABILITIES BY SIMULATION

(75) Inventor: Donald Richard Tillery, Jr., Frisco, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/052,898

(22) Filed: Mar. 31, 1998

(51) Int. Cl.[7] ............................................ G06F 13/00

(52) U.S. Cl. ......................... 703/25; 703/26; 711/154; 709/102

(58) Field of Search ...................... 395/500.34, 500.35, 395/500.48, 872, 876, 727, 728; 348/390, 425, 568; 711/154, 112, 114; 703/27, 28, 25, 26; 709/232, 102

(56) References Cited

U.S. PATENT DOCUMENTS

| | | | | | |
|---|---|---|---|---|---|
| 5,264,837 | A | * | 11/1993 | Buehler | 345/115 |
| 5,325,510 | A | * | 6/1994 | Frazier | 395/425 |
| 5,442,747 | A | * | 8/1995 | Chan et al. | 395/164 |
| 5,454,107 | A | * | 9/1995 | Lehman et al. | 395/480 |
| 5,463,422 | A | * | 10/1995 | Simpson et al. | 348/390 |
| 5,493,646 | A | * | 2/1996 | Guttag et al. | 395/164 |
| 5,553,005 | A | * | 9/1996 | Voeten et al. | 364/514 R |
| 5,574,836 | A | * | 11/1996 | Broemmelsiek | 395/127 |
| 5,606,258 | A | * | 2/1997 | Hoenninger, III et al. | 324/309 |
| 5,659,715 | A | * | 8/1997 | Wu et al. | 395/497.01 |
| 5,808,629 | A | * | 9/1998 | Nally et al. | 345/508 |
| 5,828,878 | A | * | 10/1998 | Bennett | 395/672 |
| 5,864,512 | A | * | 1/1999 | Buckelew et al. | 365/230.01 |
| 6,006,303 | A | * | 12/1999 | Barnaby et al. | 710/244 |
| 6,205,525 | B1 | * | 3/2001 | Korst | 711/154 |

* cited by examiner

*Primary Examiner*—Kevin J. Teska
*Assistant Examiner*—T. Phan
(74) *Attorney, Agent, or Firm*—Fulbright & Jaworski L.L.P.

(57) ABSTRACT

A system and method are disclosed in which multiple components make demands on a common resource, such as a common memory. When it is desirable to change certain operating parameters of a component, an algorithm is performed which determines whether the common resource can support the new operating parameters. The algorithm first determines the worst case operating environment and then evaluates whether the common resource can support the worst case situation.

15 Claims, 1 Drawing Sheet

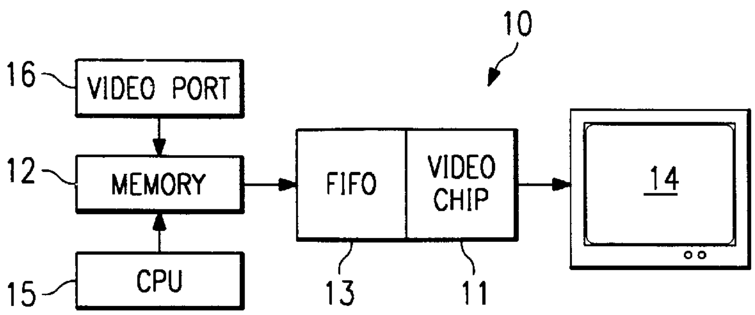
FIG. 1
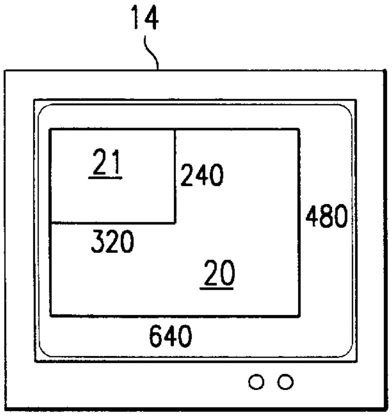
FIG. 2
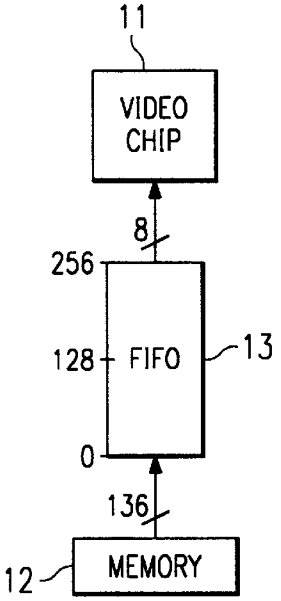
FIG. 3A
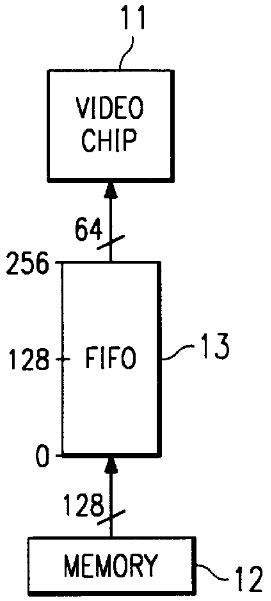
FIG. 3B
FIG. 4
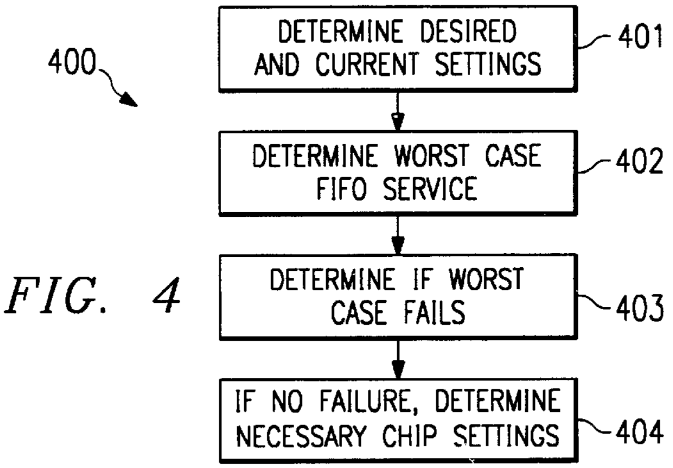

SYSTEM AND METHOD FOR DETERMINING CHIP PERFORMANCE CAPABILITIES BY SIMULATION

BACKGROUND OF THE INVENTION

In a computer system, a single memory device may serve a number of components, such as a processor, a video card and a video port. Typically, the memory device serves each system component in turn and, while one component is being serviced, the other components must wait. The demands on the system memory vary for each request and for each component. For example, the number of requests by the processor depends upon the particular code that is executing at any one time. On the other hand, the number and size of memory requests by a video card are determined by the characteristics of the display.

Typically, the video chip must access the memory often in order to continuously drive the display. Each pixel of the display corresponds to a certain group of bits in the memory. The number of memory bits per pixel depends upon several factors, including the color depth selected. The screen refresh rate affects the amount of pixel information that has to be transferred from memory to the video chip. The display type also affects the volume of data that is requested by the video chip because some displays require more processing than others. For example, in a dual scan transistor network (DSTN) display the top and bottom of the screen are refreshed at the same time. As a result, the refresh rate is effectively doubled for DSTN displays. The increased screen refresh rate requires the video chip to process twice as much pixel data, which also requires more data reads from memory.

Certain areas of the display, such as video windows, may require more video data because of increased screen resolution or color depth. Block transfer is another feature which increases the data that is transferred between the memory and the video chip. When a portion of the display is moved, such as in a "drag and drop" operation, the block transfer unit must read the pixel data at the old location, copy the data to a new location and then erase or overwrite the old pixel data. These operations increase the volume of data that is processed by the video chip and increase the amount of data that is transferred between the video chip and the system memory.

In prior art systems, a look-up table was created for individual components, such as video chips, so that users could determine whether the component would operate under various conditions. The table tracked such factors as the memory clock rate, video clock rate, color depth, refresh rate and graphics mode. If a customer wanted to use a device, then they used the table to look up specific parameters for a desired application and determined whether the chip could support that application.

As the number of potential screen resolutions, clock rates, color depth choices and other factors increased, the prior art look-up tables became bigger and bigger in order to track each parameter. Another problem with the prior art tables is that the device manufacturer had to test every possible parameter combination in the table. The size of the table allowed for errors to made due to the increasing number of variables and potential combinations.

An additional problem for prior art systems is the nature of the computer industry. As new components are developed and old components are improved, new parameters and capabilities are introduced. In many cases, these improvements are not included in look-up tables which pre-dated the improvement. Accordingly, if a customer wanted to change a clock rate, use a different refresh rate or change some other parameter for a device, then they would have to retest the component using the new capability and add the new variables to the look-up table.

SUMMARY OF THE INVENTION

The problems of the prior art are solved in a system and method which uses software to model the behavior of a component in real-time in order to determine whether the system will support various operating conditions. Rather than using a static and potentially out of date table, the present invention uses an algorithm that determines the component's current configuration and evaluates whether the component will work using a different configuration.

For example, in a video chip embodiment, the present invention reads certain registers that show the current clock rates, color depth and screen refresh rate. Using that information, the algorithm determines whether the video chip can receive and process enough pixel data from the system memory to support a different video mode. If the system's current operating parameters will allow the video chip to receive sufficient data from the memory, then the algorithm calculates which settings need to be programmed into the chip for the new mode.

This system allows a chip user, on a dynamic basis, to evaluate changes to the clock rates, screen resolution and/or screen refresh rate. The user can also evaluate new modes or plug-in devices that may effect the data rate that is required by the video chip.

It is a feature of the present invention to provide a system and method in which operating conditions for a device can be modeled in real-time using a software algorithm. The algorithm is used to determine whether a common system resource can support the device under the selected conditions.

It is another feature of the present invention to provide a system and method that is capable of determining, in real-time, whether a system resource that supports two or more system components can continue to support those components under various operating conditions.

It is a further feature of the present invention to modify certain parameters of a system component so that a common system resource will continue to support the modified component.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a block diagram of a system incorporating the present invention;

FIG. 2 is a monitor display illustrating two types of images that can be displayed on a monitor;

FIG. 3A illustrates the transfer of data from a memory to a video processor through a first-in first-out buffer;

FIG. 3B also illustrates the transfer of data from a memory to a video processor through a first-in first-out buffer; and FIG. 4 is an algorithm used in the present invention.

DESCRIPTION OF THE PREFERRED EMBODIMENTS

The present invention is capable of operating in conjunction with any device or system in which there are multiple demands upon a common resource. The invention will be described herein with respect to a preferred video chip embodiment.

FIG. 1 shows a block diagram of video system 10 that is used to display graphics in a computer system. Video chip 11 processes graphics and other information for display on monitor 14. Video chip 11 receives data from memory 12 and processes that data to generate the graphics on monitor 14. In order to ensure that graphics data is continuously available to video chip 11, first-in first-out (FIFO) buffer 13 is used to hold data from memory 12. In a preferred embodiment, video chip 11 is CIRRUS LOGIC part number GD5446 for desktop computers or GD7548 for portable computers.

Memory 12 is a common system memory device that services each of the system components in turn. Central processing unit (CPU) 15 can request data from memory 12 or store data to memory 12 as required by the executing program. Television signals or other video signals, such as a digital picture from a television decoder (not shown), can be input to memory 12 through video port 16. This digital picture data can then be transferred from memory 12 to video chip 11 for display on monitor 14.

In operation, video chip 11 creates a display using the data contained in memory 12. Essentially, the display shown on monitor 14 is a window to a certain portion of memory 12. Each pixel of the display corresponds to a group of bits in memory 12. As shown in FIG. 2, a typical display 20 on monitor 14 has 480 lines and there are 640 pixels per line. The color of each pixel depends upon the pixel data stored in memory 12. In order to display more colors, more bits are required for each pixel. For example, if a 256 color mode is selected, then each pixel must correspond to 8 bits (or one byte) of memory space. As a result, each line of display 20 would corresponds to 640 bytes of data from memory 12 or one byte per pixel per line.

Screen 20 is repainted by video chip 11 at a selected refresh rate. At a 60 Hz refresh rate, each of the 480 lines on screen 20 are repainted 60 times per second for a total of 28,800 lines that must be created by video chip 11 each second. Considering that each line has 640 bytes of data, this requires video chip 11 to process 18,432,000 bytes of pixel data per second. At faster refresh rates, video chip 11 has to process more data. For example, at a 75 Hz refresh rate, video chip 11 has to process 23,040,000 bytes of pixel data per second to drive display 20.

If more colors are used in display 20, then more data will be required for each pixel. In some applications, each pixel will correspond to two or more bytes of data. As the number of colors are increased, there is a corresponding increase in the number of bytes that must be processed by video chip 11. In order to support the selected screen size, color mode and refresh rate, video chip 11 must receive some minimum number of bytes from memory 12. If memory 12 is not able to keep up with the video demand, then video chip 11 will not be able to create every pixel on display 20.

Another consideration in determining the amount of pixel data that is required for a display is the zoom factor. If a displayed image 21 (FIG. 2) is smaller than the full screen 20, the smaller image can be zoomed to fill the larger display area. When the image is zoomed, the pixel data is spread across more pixels. For example, in FIG. 2, the size of image 21 is 240 lines by 320 dots or a quarter of screen 20. Using a 75 Hz refresh rate and one byte per pixel color depth, video chip 11 requires only 5,760,000 bytes per second from memory 12 to create image 21. This is one quarter of the data required for full screen 20 at the same refresh rate and color depth.

Video chip 11 can zoom image 21 to fit the entire screen 20 (2×zoom factor). In this case, the pixel data of image 21 will be spread among more display pixels in zoomed image 20. One method of zooming simply replicates the pixel data. Using replication, each pixel in a scan line is repeated and each line is repeated so that one byte of pixel data in image 21 corresponds to four pixels in zoomed image 20. Accordingly, for a zoomed full screen image at 75 Hz, video chip 11 only needs 5.76 Mb of pixel data per second from memory 12 compared to 23.04 Mb of data for a non-zoomed full screen image.

Other methods of zooming, such as interpolation, can also be used to create the new pixels for the zoomed image. However, the various zooming methods require changes only in video chip 11's processing and do not change the amount of pixel data that video chip 11 requires from memory 12.

In some cases, only certain parts of screen 20 require additional pixel data. For example, if a certain portion of screen 20 uses a different color depth, then video chip 11 may need more than one byte of data per pixel in order properly display that part of the image. This would cause a corresponding increase in the demand on memory 12.

FIGS. 3A and 3B illustrate potential limitations on the transfer of data from memory 12 to video chip 11 in system 10. In the example shown, FIFO 13 holds 256 bytes of data but any size FIFO could be used. Pixel information is passed from memory 12 to FIFO 13 where it is held until it is needed by video chip 11 for processing and display on monitor 14. It is important that pixel data is always available in FIFO 13 so that video chip 11 is able to continuously drive the display on monitor 14. In the example shown, FIFO 13 sets a threshold of one half its capacity or 128 bytes. When the amount of data in FIFO 13 drops below the 128 byte threshold, it sends a request to memory 12 to transmit more pixel data. The threshold, which can be set at any point in FIFO 13, is simply a cue to get more data from memory 12.

FIG. 3A represents the maximum amount of data that memory 12 can provide to FIFO 13 for a 128 byte threshold. If memory 12 sends only 128 bytes of data to FIFO 13, then FIFO 13 will never fill up. This is because while the data is being moved from memory 12 into FIFO 13, video chip 11 is also taking data out of FIFO 13 for processing. In one example, FIFO 13 sends 8 bytes of data to video chip 11 during the time that it is receiving 128 bytes from memory 12. In this case, when the transfer from memory 12 is complete, FIFO 13 will be 8 bytes short of a full 256 bytes. To compensate for this, when FIFO 13 reaches its refill threshold level of 128 bytes, it can request 136 bytes of data from memory 12. In this case, after 136 bytes are received by FIFO 13 and 8 bytes are sent to video chip 11, FIFO 13 will be full at 256 bytes. There will be no room for additional data at this point, therefore if more data is transferred (i.e. over 136 bytes) some data will be lost due to a data overrun in FIFO 13.

Sometimes FIFO 13 will have to wait to be serviced by memory 12. This will occur when other system components have requested memory access before FIFO 13 or video chip 11 request memory access. Due to the delay, more data will be move out of FIFO 13 than expected. For example, in a best case example, a total of 8 bytes are output when memory 12 immediately responds to the data request. But in a less optimal situation, more than 8 bytes will be output before memory 12 responds to FIFO 13's data request. Therefore, when memory 12 is eventually able to provide data to FIFO 13, the requested 136 bytes will not be sufficient to fill FIFO 13. If memory 12 takes too long to service FIFO 13, then the buffer will empty and no data will be available to video chip 11 for processing.

FIG. 3B represents a worst case scenario in which 64 bytes are transferred out of FIFO 13 during the time it takes memory 12 to respond to the access request and transfer 128 bytes. This establishes a minimum threshold for FIFO 13 because if the data in FIFO 13 falls below 64 bytes, then it could empty out before enough data is received from memory 12.

Another factor which affects the rate of data transfer between memory 12 and FIFO 13 is the memory clock. If the memory clock is too slow, then memory 12 may have difficulty transferring sufficient data, even if memory 12 immediately responds to FIFO 13's access request.

As image 20 becomes more complex due to color depth, screen refresh rate or image size, more and more data will required by video chip 11. This data demand will be reflected in the number data requests from FIFO 13 to memory 12. If the data transfer rate between memory 12 and FIFO 13 is too low, or if the output from FIFO 13 to video chip 11 is too high, then gaps will be created in the transferred data. This missing data will be reflected by degradation of the image that is displayed on screen 20.

Other system components and functions can have a detrimental effect on memory 12. For example, if FIFO 13 has to wait for memory 12 to service CPU 15 or video port 16, then FIFO 13 could run dry because of the delay. Therefore, the design of system 10 has to take into account the effect on video chip 11 due to memory requests by other devices.

In the present invention, video chip 11 monitors various parameters in system 10 and determines in real-time whether it can support a selected graphics or display mode. FIG. 4 depicts algorithm 400 which is used by video chip 11 to determine whether system 10 can support changes in the display parameters. In step 401, the desired and current display settings are determined. Typical settings that are evaluated include the graphics mode, graphics depth, screen refresh rate and zoom factor.

In step 402, the algorithm determines the worst case FIFO service. The worst case scenario has to take into account the maximum pixel demand by video chip 11 and the minimum service by memory 12. Step 402 must evaluate potential demands that other components may make on memory 12 in case FIFO 13 has to wait until all of the other system components are serviced. In step 403, the algorithm determines whether FIFO 13 will be able to receive enough data from memory 12 and supply sufficient data to video chip 11 in order to meet the display requirements. If the worst case scenario fails, then system 10 cannot accept the new graphics mode. If the worst case scenario does not fail, then, in step 404, the algorithm determines what chip settings, if any, are needed to support the new graphics mode.

Although the invention has been described using the example of a video chip in a computer system, it will be understood that the present invention will be useful in any system in which multiple components make demands on a common resource. In any such system, the algorithm can simply be modified to determine the maximum demand level on the common resource and the worst case situation in which the common resource would have to support this demand level.

Although the present invention and its advantages have been described in detail, it should be understood that various changes, substitutions and alterations can be made herein without departing from the spirit and scope of the invention as defined by the appended claims.

What is claimed is:

1. A method for determining whether a computer system can operate using a selected set of parameters, wherein said system comprises a number of components that each request data from a common memory, said method comprising the steps of:

determining a worst case demand level for said common memory, wherein said worst case demand level is a maximum data demand on said common memory by said components when said computer system operates under said selected set of parameters; and evaluating, in real-time, whether said common memory supports said selected set of parameters when said common memory is operating at said worst case demand level.

2. The method of claim 1 wherein said method is accomplished using a set of software instructions.

3. The method of claim 1 wherein one of said components is a video device.

4. The method of claim 3 wherein said selected parameters comprise selected display parameters associated with said video device.

5. The method of claim 3 further comprising the step of:

transferring data from said common memory to said video device, wherein an amount of said data corresponds to said selected display parameters.

6. The method of claim 5 wherein said evaluating step evaluates whether said common memory can provide a sufficient amount of data to said video device.

7. A system comprising a plurality of components that request data from a common memory resource, wherein each of said components operate under a set of parameters, said system comprising:

a video processor for determining a worst case demand level for said common memory resource, wherein said worst case demand level is a maximum access demand level on said common memory resource by said components operating under said set of parameters and for evaluating, in real-time, whether said common memory resource supports said selected set of parameters when said common memory resource is operating at said worst case demand level.

8. The system of claim 7 wherein one of said components is a video device.

9. The system of claim 8 wherein said set of parameters comprise display parameters associated with said video device.

10. The system of claim 8 wherein said video processor further comprises:

a data buffer for receiving data from said common memory device.

11. The system of claim 10 wherein said video processor evaluates whether said common memory device provides a sufficient amount of data to said data buffer.

12. A method of determining whether a computer system can operate using a selected set of parameters, comprising:

operating said computer system in real-time under a first set of parameters, wherein said computer system is comprised of a number of components including a common memory;

receiving a request to operate said computer system in real-time under a second set of parameters, wherein said second set of parameters is different from said first set of parameters;

determining whether said common memory possesses sufficient capacity to satisfy memory requests according to a worst case demand level, wherein said worst case demand level is defined by maximum memory requirements of said number of components when said computer system operates under said second set of parameters;

when said step of determining determines that said common memory would fail to satisfy memory requests according to said worst case demand level, rejecting said second set of parameters; and when said step of determining determines that said common memory would satisfy memory requests according to said worst case demand level, permitting operation of said computer system in real-time under said second set of parameters.

13. The method of claim 12 wherein said second set of parameters is different from said first set of parameters due to addition of a plug-in device.

14. The method of claim 12 wherein said second set of parameters possesses a value that is different from said first set of parameters, wherein said value is related to one item selected from the list of: clock rate, refresh rate, screen resolution, and color mode.

15. A method of determining whether a computer system can operate using a selected display mode, wherein said computer system has a common memory device and a video processor, and wherein said common memory device receives data requests from multiple components in said computer system, said method comprising:

receiving display data from said common memory device;

buffering the received display data;

monitoring an amount of buffered display data;

requesting additional display data when said amount of buffered display data falls below a selected level;

determining a worst case demand level for said selected display mode in real-time, wherein said worst case demand level is associated with a maximum display data demand by said video processor; and comparing said worst case demand level to a maximum data output rate from said common memory device.

* * * * *